United States Patent [19]

Veeder

[11] 4,046,845
[45] Sept. 6, 1977

[54] AIR DIFFUSER ELEMENT

[75] Inventor: Richard K. Veeder, Pittsford, N.Y.

[73] Assignee: Ferro Corporation, Cleveland, Ohio

[21] Appl. No.: 698,933

[22] Filed: June 23, 1976

[51] Int. Cl.² ............................................. B01D 47/02
[52] U.S. Cl. ..................................... 261/122; 239/145
[58] Field of Search ........................... 239/145, 34, 57; 261/122, 124

[56] References Cited

U.S. PATENT DOCUMENTS

| 1,936,305 | 11/1933 | Leffler | 261/122 |
| 2,040,941 | 5/1936 | Jones | 261/122 |
| 3,083,953 | 4/1963 | Langdon et al. | 261/122 |
| 3,970,731 | 7/1976 | Oksman | 261/122 |

FOREIGN PATENT DOCUMENTS 289,801  10/1931  Italy ..................................... 261/122

Primary Examiner—Evon C. Blunk
Assistant Examiner—Michael Mar
Attorney, Agent, or Firm—Milton L. Simmons

[57] ABSTRACT

An air-permeable diffuser disc (diffuser element) for use in an air diffuser head for aerating liquids, particularly sewage, characterized by the outer periphery of said permeable disc having a higher density than the balance of said disc, rendering same substantially impermeable, thereby preventing edge leakage which generates larger, undesirable bubbles, by forcing all air to diffuse from the outer, horizontal face of said element into the liquid to be aerated, resulting in a uniform flow of smaller, more effective bubbles.

6 Claims, 5 Drawing Figures

AIR DIFFUSER ELEMENT

This invention relates to an improved diffuser element for use in a diffuser head for diffusing air into liquids, particularly sewage, in the so-called activated sludge process of sewage purification.

The art in this field is fairly well developed, and is generally exemplified by U.S. Pat. Nos. 2,639,139, 3,532,272 and 3,700,197.

As background for a more ready understanding of the specification, the means for diffusing air into sewage may be generally described as follows.

The sewage is normally collected in a large settling pond, tank or basin, having a bottom along which is disposed, generally in a manifold type structure, a series of main air supply pipes disposed in spaced-apart, parallel relationship.

Periodically spaced along each main air supply pipe, are a number of diffuser heads, all arranged in such a manner that the bottom of the sewage treatment tank is fairly well covered with diffuser heads.

The principal, operative component of each diffuser head is an air-permeable member communicating with an air chamber contained within the diffuser head, which air chamber in turn communicates directly with its supporting main air pipe.

In operation then, air under pressure is supplied simultaneously to all main air supply pipes, causing pressurized air to fill the chamber to each diffuser thereby forcing air through the finely porous diffuser element of each diffuser head, in the form of small bubbles, and into the sewage to be treated.

The diffuser element of a diffuser head is normally made of some air permeable, porous ceramic by any of many well known conventional manufacturing processes.

Generally speaking, the finer the bubbles which can be diffused into the sludge, the better. This for the reason that, as in any chemical reaction, the finer the "particle size" of the reactants, the more surface area exposed for reaction.

Thus, one large bubble of unit volume cannot react nearly so quickly or effectively with the sewage sludge, as a thousand bubbles totaling the same unit volume.

One of the disadvantages of the porous diffuser elements used heretofore, was that much of the air was diffused laterally out a vertical face of the diffuser element, rather than upwardly, through and out the horizontal upper face of said element.

Obviously, the problems associated with his phenomenon had not previously been recognized, all as exemplified by the prior art, particularly U.S. Pat Nos. 2,639,131 and 3,700,197, which disclose rather liberal and extensive vertical permeable surfaces. See for example FIG. 1 of U.S. Pat. No. 3,700,197.

It was discovered that if a series of bubbles emanate from a vertical porous face, they tend to coalesce, as all are rising in substantially the same vertical path. Larger bubble agglomerates are thus formed, resulting in decreased activating efficiency for a given volume of air passed through the diffuser element.

It is therefore an object of this invention to provide a means, and method for producing same, of improving the efficiency of a diffuser element, by eliminating edge-diffusion through a vertical edge member, or face, of a diffuser element.

Referring now to the drawings.

Figure 1:
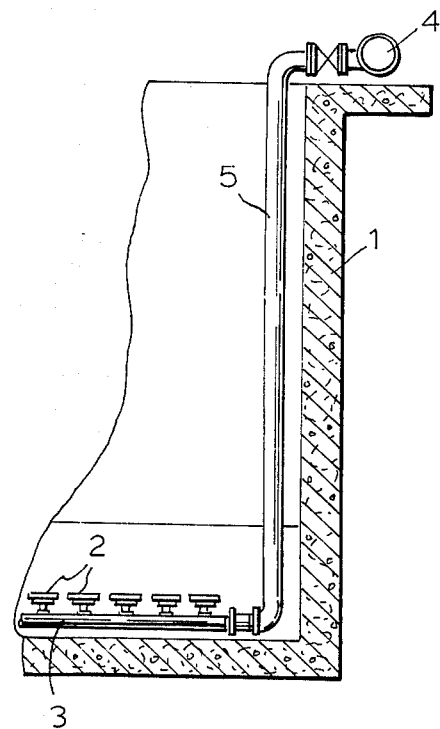
FIG. 1 is a diagrammatic, fragmentary sectional elevation through an aeration tank depicting the manner in which a series of diffuser heads are disposed along the floor of said tank.

Referring now more specifically to the drawings, the aeration tank shown in FIG. 1 comprises a tank 1, along the bottom of which the air diffuser apparatus is located.

The latter comprises an air supply pipe 3, or a series of same, along the length of which are mounted, at spaced intervals, a series of diffuser heads 2, which are supplied with air from air supply pipe 3. The air for the air supply pipe(s) is taken from an air main 4 by way of a downtake pipe 5, air being supplied under appropriate pressure by any number of well known air supply means.

Figure 2:
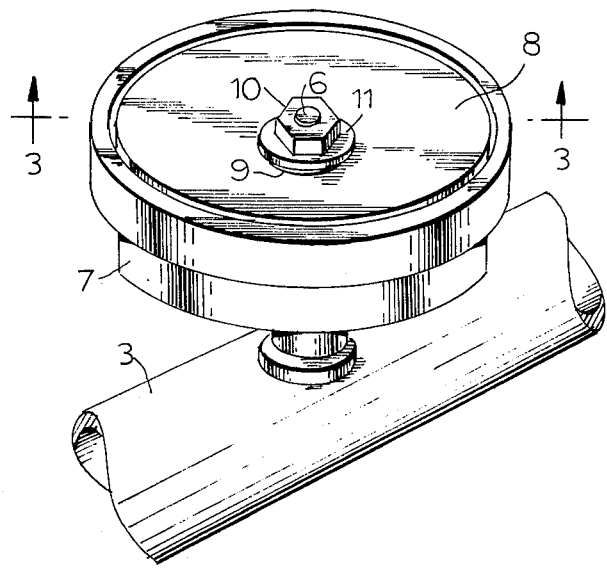
FIG. 2 is a perspective view of the overall diffuser head assembly of this invention.
Figure 3:
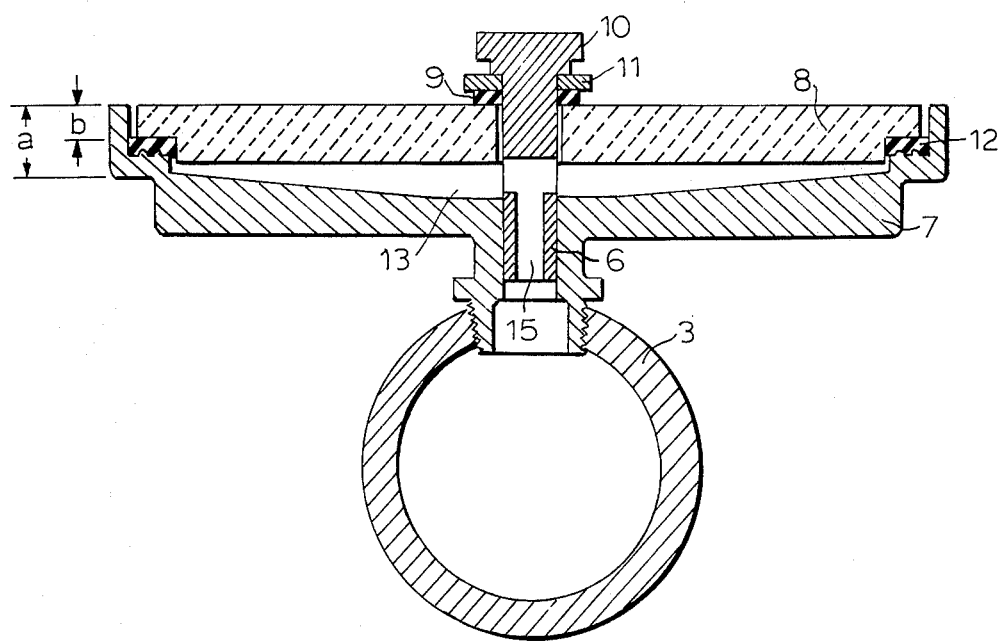
FIG. 3 is a section, 3—3, through the diffuser head of FIG. 2.
Figure 5:
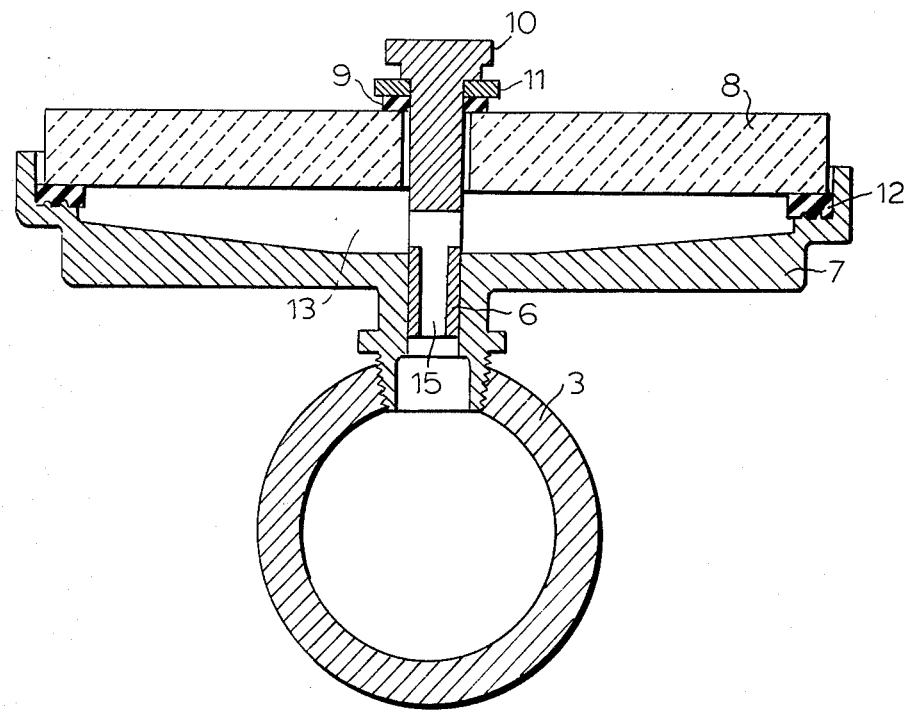
FIG. 5 is a cross-sectional view of prior disc-shaped diffuser element.

The diffuser head of this invention as shown in FIG. 2 and 3, comprises a tubular stem 6 screwed into diffuser head base member 7, which in turn may be screwed or otherwise fixed in an outlet in the air supply pipe 3; there being, obviously, several such outlets spaced apart along the air supply pipe, one for each diffuser head.

A diffuser element, of porous ceramic material 18, is mounted on base member 7, the tubular stem 6 projecting up into and through the diffuser element through a circular opening therethrough as shown in FIG. 3.

A resilient sealing washer 9 is provided between the top of the diffuser element, and nut 10 and metal washer 11. The diffuser element may thus be fixed to the base member 7 by tightening nut 10 until the diffuser element is firmly seated to base member 7; a circular gasket 12, of any resilient material such as the various silicones, provides an air seal between the air chamber 13 within the different head, and the sewage to be treated.

The diffuser element 8 formed with a non-threaded circular opening therethrough to permit setting said element into position over tubular stem 6, resilient washer 9 providing the required air seal to prevent loss of air through said circular opening.

Within tubular stem 6, there is provided a two, three or four way "T" passage communicating with both air chamber 13, and the air supply pipe via the continuous opening 15 in the bottom of base member 7, for maintaining a constant supply of air under pressure within air chamber 13.

Figure 4:
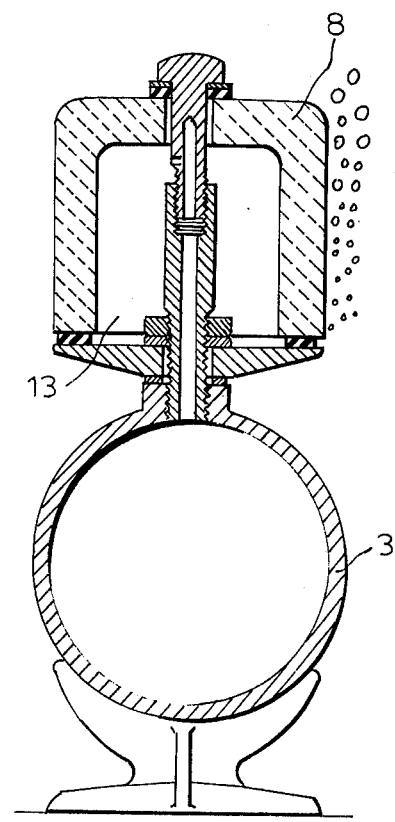
FIG. 4 is a cross-section through a prior art dome-shaped diffuser element illustrating bubble coalescence from a vertical surface.

Referring now to FIG. 4, it will be seen that the vertical edge member, or face, of the diffuser head depicted in U.S. Pat. No. 3,700,197 permits a large volume of air to escape laterally, resulting in a disproportionate percentage of larger, coalesced air bubbles, thereby materially decreasing the activating efficiency of a unit volume of air.

To solve this heretofore unrecognized problem encountered with prior art air diffuser elements, this invention contemplates rendering the peripheral edge member of the diffuser element of this invention less air-permeable to thereby completely eliminate any lateral diffusion, forcing all air out through the horizontal upper face of the diffuser element, so as to achieve essentially 100% efficiency from the standpoint of maximizing small bubble concentration.

In order to prevent lateral displacement of air through the side member of the diffuser element, it was first redesigned from a dome-shape to a substantially flat member having spaced apart, generally planular, opposed faces.

The outer periphery thereof was then densified, while still maintaining the minimum thickness required in the functional area of the diffuser element necessary to produce fine bubbles. That is, if the permeable diffuser element is too thin in vertical cross-section, the air under pressure passes too rapidly through the permeable manner, resulting in large bubbles.

On the other hand, in order to manufacture a perfectly flat disc having generally the form of a cylinder, with a densified, non-permeable outer periphery, the disc would have to be initially pressed with a thicker, outer peripheral ridge, which could then be flattened in a re-press operation.

This, however, had the drawback of tending to force the thicker peripheral edge back into the main body of the disc, thereby causing unpredictable patterns within the disc of varying permeability.

The disc of this invention was finally achieved by pressing a flat, horizontal disc of ceramic in its green, unfired pliable state; then, as a second pressing step, the disc was re-pressed in a ring press, to thereby compress the outer periphery of the disc-shaped diffuser element from its initial thickness "$a$", to a thickness "$b$", leaving an off-set step having the verticle dimension of ($a - b$).

There is thus provided a diffuser element having an effective vertical air-permeable centrally disposed area, with a compressed, less air-permeable outer periphery to prevent lateral leakage. As a secondary benefit of the impermeable outer periphery, the off-set step ($a - b$) serves the added function of permitting the air diffuser element to be recessed so that its top surface is flush with the side flange of the base member providing much improved edge protection for the recessed, somewhat fragile, diffuser element.

While the preferred embodiment of this invention is a circular, generally disc-shaped air diffuser element, it is to be readily understood that it could conceivably be oval, square, or any outline, it being required only that the upper and lower faces have generally coincident outlines conforming to, and circumscribed by, a peripheral edge member, said edge member having a greater, substantially non-permeable, density than the balance of said diffuser element, the interior face of the element forming a part of the air chamber of said diffuser head, when assembled as shown.

And, while the preferred embodiment shows the step configuration of the outer edge member of the air diffuser element, the element could be produced with a denser, outer peripheral face member, but without the peripheral step ($a - b$), in its edge member, though the latter is preferred.

I claim:

1. An improved unitary diffuser element adapted for assembly into an air diffuser head for diffusing air into liquids, said diffuser head having a substantially enclosed air chamber therewithin, the improved diffuser element having exterior and interior faces generally opposed and spaced apart, said exterior face being substantially planar, both faces having generally coincident outlines conforming to, and circumscribed by, an integral, peripheral annular zone, said zone having a greater, substantially non-permeable, density than the balance of a said diffuser element, though compositionally identical to the balance of said element, the interior face of said element forming part of the air chamber aforesaid when assembled in said diffuser head.

2. The element of claim 1 wherein the diffuser element has a curvilinear outline.

3. The element of claim 2 wherein said outline is substantially circular.

4. The element of claim 1 wherein said element has centrally disposed means for fixing same to said diffuser head.

5. The element of claim 2 wherein said element has centrally disposed means for fixing same to said diffuser head.

6. The element of claim 3 wherein said element has centrally disposed means for fixing same to said diffuser head.

* * * * *